United States Patent
Stevenson et al.

(10) Patent No.: US 8,250,728 B2
(45) Date of Patent: Aug. 28, 2012

(54) METHOD OF JOINING WITH SELF-PIERCING RIVET AND ASSEMBLY

(75) Inventors: Robin Stevenson, Bloomfield, MI (US); Pei-Chung Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1065 days.

(21) Appl. No.: 12/180,940

(22) Filed: Jul. 28, 2008

(65) Prior Publication Data

US 2010/0018027 A1   Jan. 28, 2010

(51) Int. Cl.
*B23P 11/00* (2006.01)
(52) U.S. Cl. ..................................... 29/525.14
(58) Field of Classification Search .............. 29/525.06, 29/525.05, 525.13, 525.14, 432, 428, 878, 29/243.53
See application file for complete search history.

(56) References Cited

U.S. PATENT DOCUMENTS

| | | | |
|---|---|---|---|
| 6,694,597 B2 | 2/2004 | Wang et al. | |
| 6,732,420 B2 | 5/2004 | Wang et al. | |
| 6,905,295 B2 | 6/2005 | Stevenson et al. | |
| 6,962,469 B2 | 11/2005 | Wang et al. | |
| 7,017,255 B2 | 3/2006 | Wang et al. | |

FOREIGN PATENT DOCUMENTS

| | | | |
|---|---|---|---|
| DE | 19630488 | * | 1/1998 |
| JP | 05174940 | * | 7/1993 |
| JP | 200643769 | * | 2/2006 |

* cited by examiner

*Primary Examiner* — John C Hong
(74) *Attorney, Agent, or Firm* — Quinn Law Group, PLLC

(57) ABSTRACT

A method of joining a multiple member work-piece includes stacking the members of the work-piece on a die such that a first of the members rests on the die. Next, a rivet is driven into the second member until the rivet penetrates the members and deforms. The rivet is then welded to the first member to strengthen the riveted joint. Different mechanisms may be used to accomplish the welding. For example, a laser beam may be directed through a passage in the first die to target the area of the riveted joint to be welded. Alternatively, the die set, rivet, and first member may be arranged to form an electrical circuit that welds the joint via resistance heating. An assembly of a multiple member work-piece and a rivet made according to the method is also provided.

8 Claims, 5 Drawing Sheets

METHOD OF JOINING WITH SELF-PIERCING RIVET AND ASSEMBLY

TECHNICAL FIELD

The invention relates to a method of joining members using a self-piercing rivet, and an assembly including the joined members and rivet.

BACKGROUND OF THE INVENTION

Self-piercing rivets are fastening mechanisms that have been widely used for the joining of non-ferrous materials and have demonstrated capability in joining ferrous materials as well. Self-piercing rivets join overlapping members by driving the rivet under pressure into the members, and creating a mechanical interference between the members and the rivet by using a die to modify the rivet geometry.

SUMMARY OF THE INVENTION

A riveted joint may be subjected to periodic loading which may cause long term loosening and incremental local deformations that reduce the direct contact between the rivet and the joined members. The direct contact is integral to maintaining the joint strength. Thus it would be desirable to further strengthen a rivet joint by combining the mechanical strength of the riveted structure with some localized fusion (or bonding) between the rivet and the joined members.

A method of joining a multiple member work-piece that provides a capable of acting as a load-bearing joint, such as in a vehicle, is provided. The method includes stacking members of the work-piece on a die with a first of the members resting on the die. Next, a rivet is driven into the stacked members until the rivet penetrates all of the members and deforms to establish a riveted joint. Note that while full penetration of the uppermost stacked member or members (more than two members are used) will occur, normal practice is to achieve only partial penetration of the first member. The rivet is then welded to the first member to strengthen the riveted joint. Different mechanisms may be used to accomplish the welding. For example, a laser beam may be directed through a passage in the first die to target the area of the riveted joint to be welded. Alternatively, the die set, rivet, and first member may be arranged to form an electrical circuit that welds the joint via resistance heating.

An assembly of a multiple member work-piece and a rivet made according to the method includes members of the work-piece, with the second member stacked on the first member, and a rivet penetrating through the second member into the first member and deformed to establish a riveted joint. It should be noted that additional work-piece members may be used. For example, an additional member or multiple additional members may be stacked between the first member and an uppermost one of the members. Due to the welding portion of the method, performed after the mechanical connection is made, the rivet and first member are characterized by a fused region. The first member and the rivet must be weldably compatible, i.e., they must be of material(s) known in the art as capable of creating a strong welded joint. For example, the first member may be a ferrous material if the rivet is a ferrous rivet. Alternatively, both the rivet and the first member may be an aluminum alloy. Compatible dissimilar materials, such as a polymer rivet and a polypropylene sheet may be used. The second member and any additional members stacked thereon may be, but are not limited to being, metallic (e.g., ferrous or aluminum), a polymer, polypropylene or another material.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
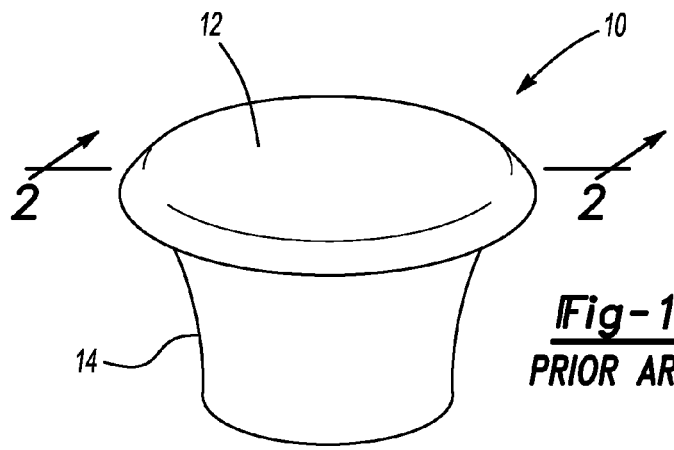
FIG. 1 is a schematic perspective illustration of a self-piercing rivet.
Figure 2:
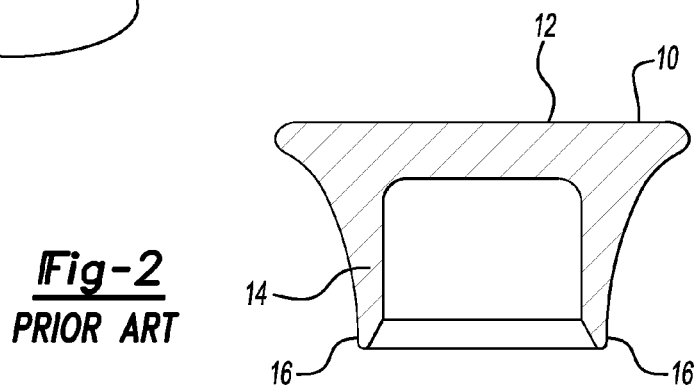
FIG. 2 is a schematic cross-sectional illustration of the rivet of FIG. 1 taken at the lines 2-2 shown in FIG. 1.
Figure 3:
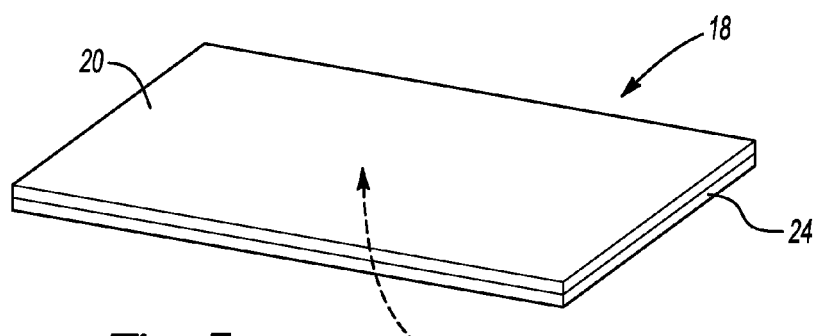
FIG. 3 is a schematic perspective illustration of a work-piece of two stacked metallic sheets.
Figure 4:
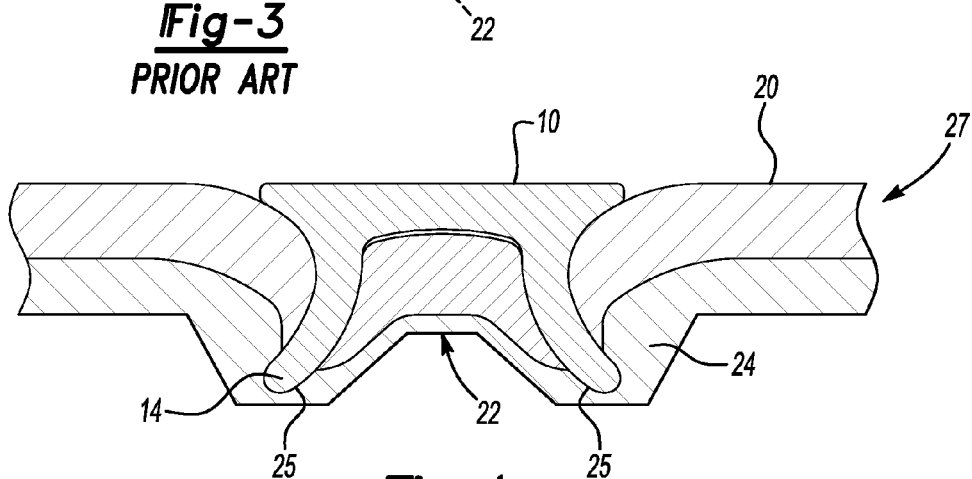
FIG. 4 is a schematic perspective illustration in schematic cross-sectional and fragmentary view of the rivet of FIG. 1 penetrating the stacked sheets of FIG. 3 and deformed to form a mechanically riveted joint.

Referring to the drawings, wherein like reference numbers refer to like components, FIG. 1 shows a rivet 10 having a head portion 12 and a generally cylindrical hollow shank 14 with a tapered extremity 16 (shown in FIG. 2). The rivet 10 is configured to mechanically fasten the work-piece 18 of FIG. 3 when subjected to a driving force, such as may be achieved by a punch acting on head 12, by piercing a top sheet 20, also referred to as a second member, and with the shank 14 only partially piercing and entering, but not completely passing through a bottom sheet 24, also referred to as a first member (i.e., not passing through the bottom surface 22 of bottom sheet 24). The shank 14 and the material of bottom sheet 24 immediately adjacent to shank 14 are then deformed through the action of a lower die 32 (or lower die 232 of the embodiment shown in FIGS. 6 and 8) in order to mechanically interlock the two sheets 20, 24 as shown in FIG. 4. The rivet 10 is referred to as a "self-piercing" rivet, as the tapered extremity 16 is sufficient to cause penetration of the sheets 20, 24 under the force of a die set and the shank 14 is configured to deform to create a mechanical joint without requiring a lead hole for the rivet 10 in the sheets 20, 24. The bottom surface 22 of the first sheet 24 is subjected to the force of a die set as described herein such that the shape of the surface 22 is modified. When connected as shown in FIG. 4 to form assembly 27, the rivet 10 and sheets 20, 24 create a mechanical joint or interface 25, at which the rivet 10 and the sheets 20, 24 are joined but not fused to one another.

Figure 5:
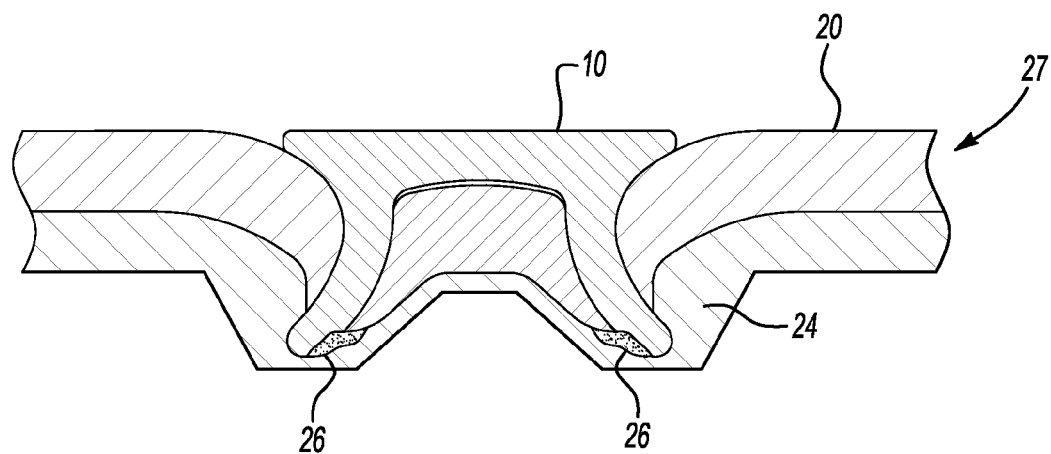
FIG. 5 is a schematic perspective illustration in schematic cross-sectional and fragmentary view of the rivet and sheets of FIG. 4 after welding the mechanically riveted joint to establish a fused region at the joint.
Figure 7:
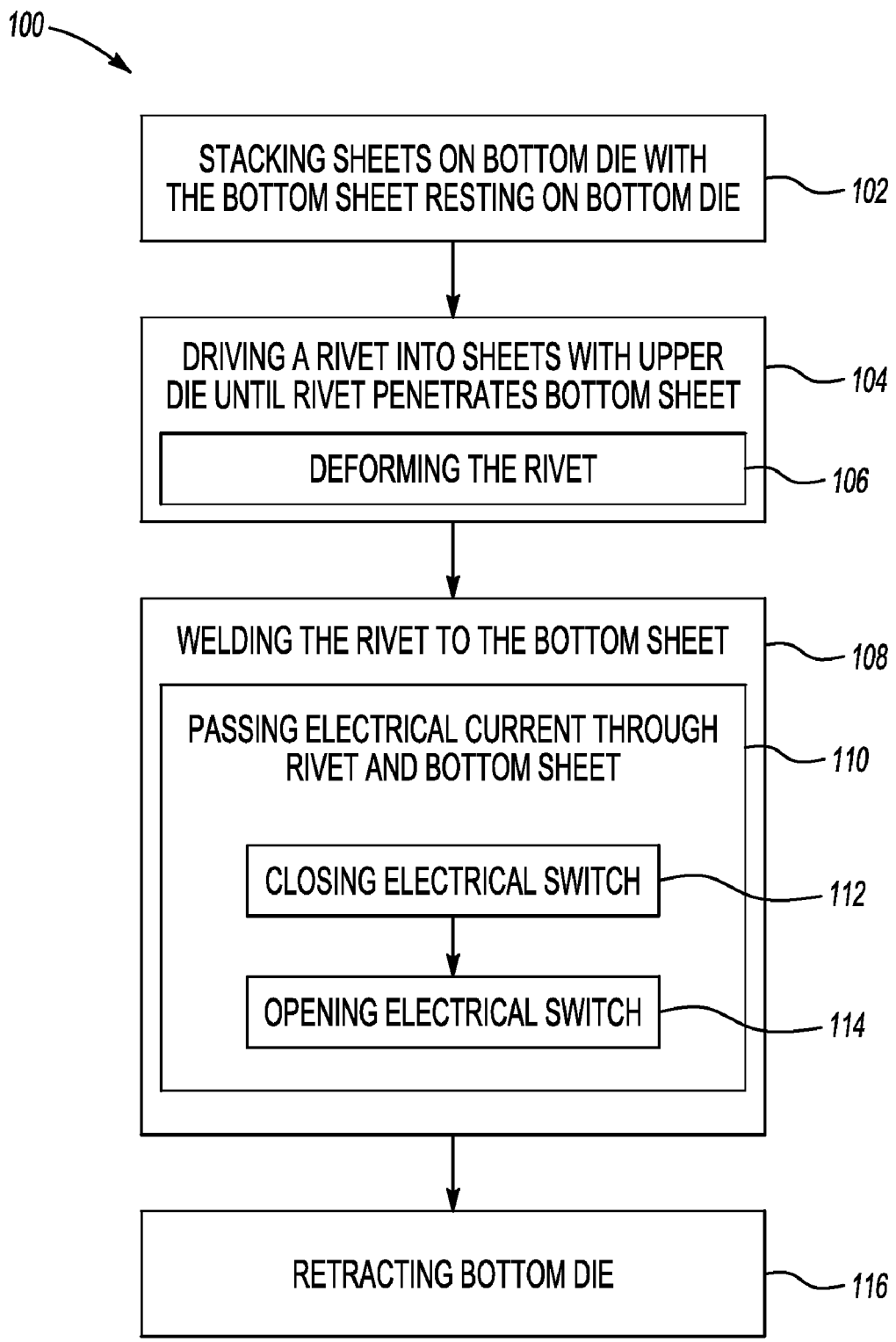
FIG. 7 is a flow chart illustrating a method of joining the work-piece of FIG. 3 using the die set of FIG. 6 to provide the mechanically riveted joint and fused region of FIG. 5.
Figure 10:
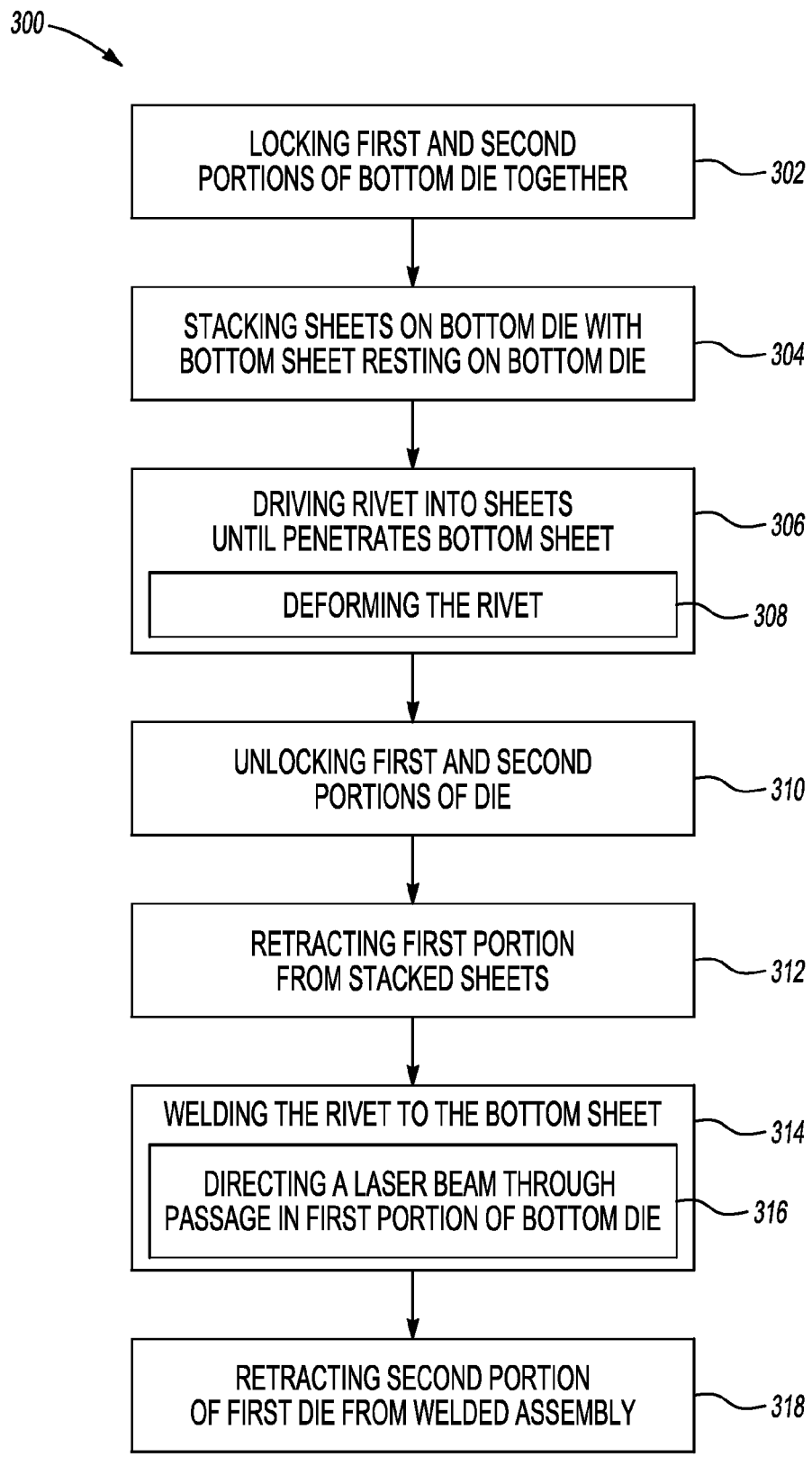
FIG. 10 is a flow chart illustrating a method of joining a work-piece using the die set of FIGS. 8 and 9 to provide the mechanically riveted joint and fused region of FIG. 9.

When further processed according to any of the methods of FIG. 7 or FIG. 10, as described herein, the rivet 10 is welded to the bottom sheet 24 to create a fused region 26 at the interface 25 of the rivet 10 and the bottom sheet 24 such that the mechanical joint 25 of FIG. 4 is supplemented by a fused region 26 in which the bottom sheet 24 and the rivet 10 partially melt into one another, losing their separate distinctive boundaries, as shown in FIG. 5, with the fused region 26 contributing to the strength of the mechanical interface 25, as the material of the rivet 10 and the bottom sheet 24 are now commingled. As explained below, the fused region 26 is most conveniently achieved if both the rivet 10 and the bottom sheet 24 are ferrous materials, having similar melting temperatures; however, the rivet 10 and bottom sheet 24 may be of other types of materials, including materials different from one another provided they are weldably compatible in that they may be fused together to create a commingled region which exhibits sufficient mechanical strength and ductility appropriate for the expected purpose of the assembly 27, as will be well understood by those skilled in the art. For example, the rivet 10 and the bottom sheet 24 may be both ferrous, both aluminum, or may be different materials.

The fused region 26 should be considered representative of a wide range of fused areas which result from this process. Depending on local values of the interfacial resistance between rivet shank 14 and first member 24, initial melting may occur anywhere along the interface 25 between them. Similarly, depending on the duration of application of the applied current, the extent of fused region 26 may be greater or less than is depicted and may, if both first and second members 20, 24 are compatible with the rivet 10, also involve the second member 20. However, to strengthen the interface 25, at least a minimum fused region 26 as shown must be developed around at least a part of the circumference of shank 14.

Figure 6:
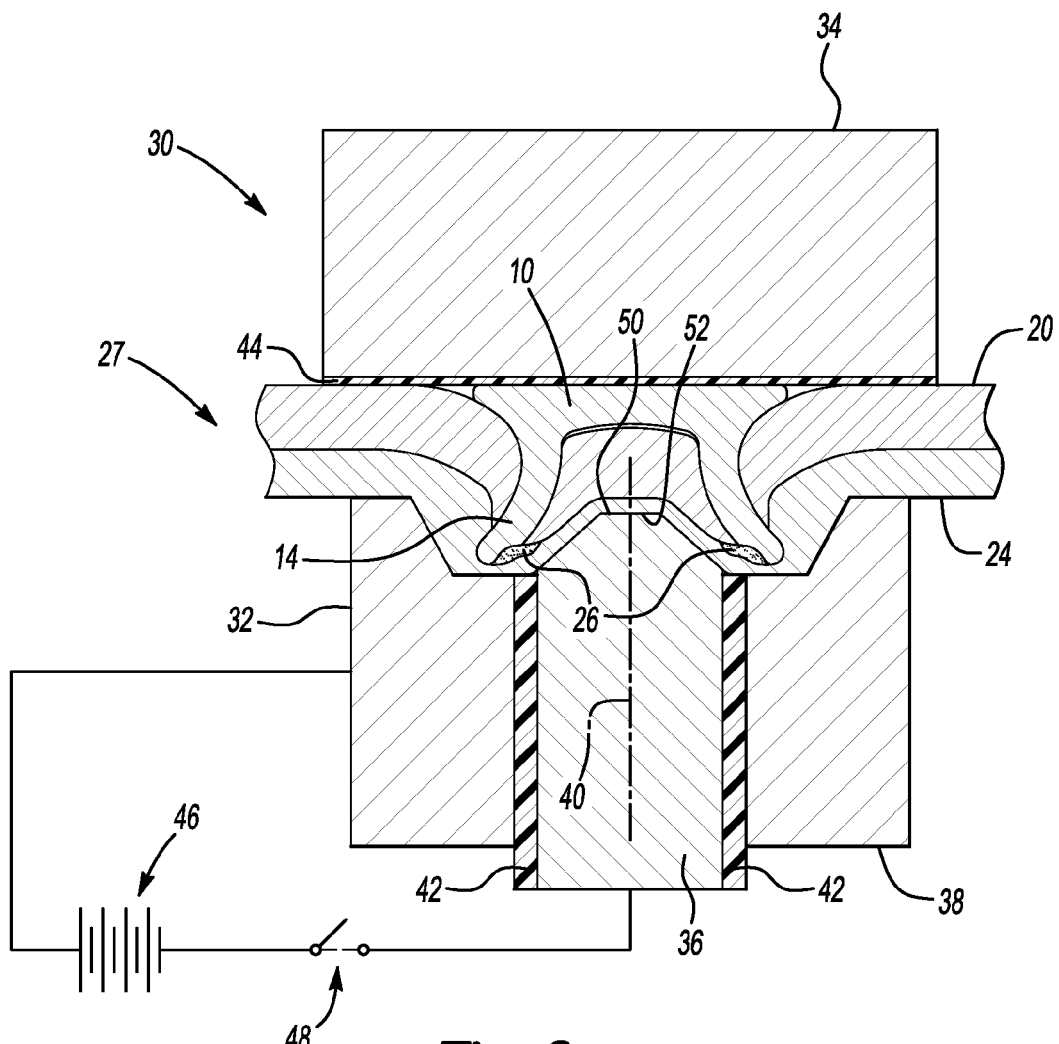
FIG. 6 is a schematic cross-sectional illustration of a first embodiment of a die set configured to form the mechanically riveted joint and fused region of FIG. 5.

Referring to FIG. 6, the assembly 27 is shown supported in a die set 30 used to form the assembly 27 according to the method 100 of FIG. 7. The die set 30 includes the lower die 32, referred to as the first die, and a punch 34, referred to as the second die. The lower die 32 is a split die that includes a generally cylindrical first portion 36, also referred to as an inner die portion, and an annular second portion 38, also referred to as an outer die portion. The first portion 36 and second portion 38 are axisymmetric about an axis 40. The first portion 36 and second portion 38 need not be independently movable in order to form the assembly 27 according to the method 100. However, the portions 36, 38 must be electrically insulated from one another with an isolator 42 surrounding the cylindrical first portion 36. Similarly, an electrical isolator 44 separates the punch 34 from the rivet 10 and the top sheet 20.

An electrical power source 46 is connected with the second portion 38 and with the first portion 36, and selectively creates an electrical circuit when a normally open switch 48 is closed (shown open in solid, closed in phantom), with the electrical circuit running from the second portion 38 to the first portion 36 and through the electrically conducting components of the assembly, namely at least the rivet 10 and the bottom sheet 24.

Referring to FIG. 7, the method 100 of joining a multiple member work-piece will be explained with respect to the structure of FIGS. 1-6, including the work-piece 18 of FIG. 3. Specifically, the method 100 includes step 102, stacking first and second members of the work-piece 18 (i.e., top sheet 20 and bottom sheet 24) on a first die (i.e., bottom die 32 with first portion 36 and second portion 38) with the bottom sheet 24 resting on the bottom die. Next, step 104 is performed, driving a rivet 10 into the sheet 20 using a second die (i.e., punch 34) until the rivet 10 penetrates the bottom sheet 24. Sub step 106, deforming the rivet 10, is included in step 104, and is accomplished in part due to the shape 50 of the first portion 36, which creates a complementary shape 52 of the bottom sheet 24 when pressed against the first portion 36, causing the shank 14 to spread and deform as shown in FIG. 6.

At this point in the method 100, the assembly has the mechanical joint or interface 25 shown in FIG. 4. Step 108, performed next, will add the fused region 26, strengthening the assembly 27. Under step 108, the rivet 10 is welded to at least the bottom sheet 24, and eventually to the top sheet 20, as discussed above. In the embodiment of FIG. 6, the welding is by resistance welding, accomplished by sub step 110, passing electrical current through the bottom sheet 24 and rivet 10 until both components melt to create the fused region 26. Sub step 110 is accomplished by sub step 112, closing the switch 48 to create the circuit for the electrical power source 46 and through the second die portion 38, the lower sheet 24, the rivet 10 and the first die portion 36, all of which are conductive. Preferably, both the rivet 10 and the lower sheet 24 have similar melting points. The upper sheet 20 may or may not be conductive. If conductive, the upper sheet 20 will also be part of the circuit. After a fused region 26 is created, the method 100 includes step 114, opening the electrical switch to cease the current flow. After an amount of time sufficient to allow cooling of the fused region 26, the bottom die (first portion 36 and second portion 38) is retracted under step 116, so that the assembly 27 may be removed from the die set 32.

Figure 8:
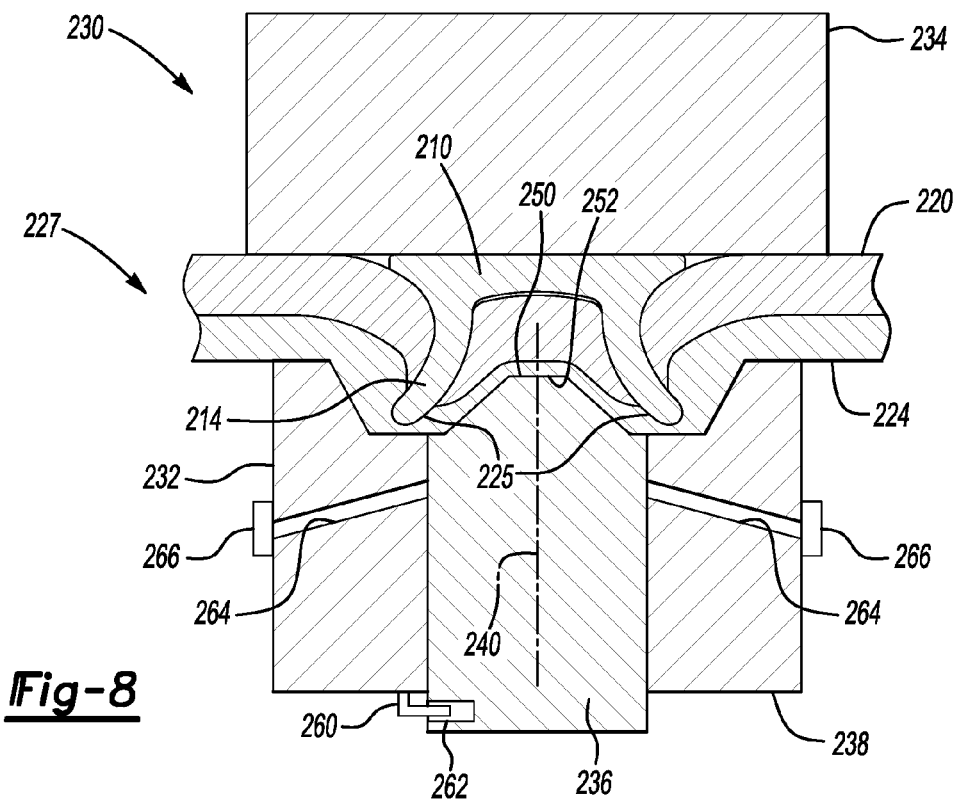
FIG. 8 is a schematic cross-sectional illustration of a second embodiment of a die set configured to form the mechanically riveted joint with a fused region, showing a first portion of the lower die locked to a second portion of the lower die.
Figure 9:
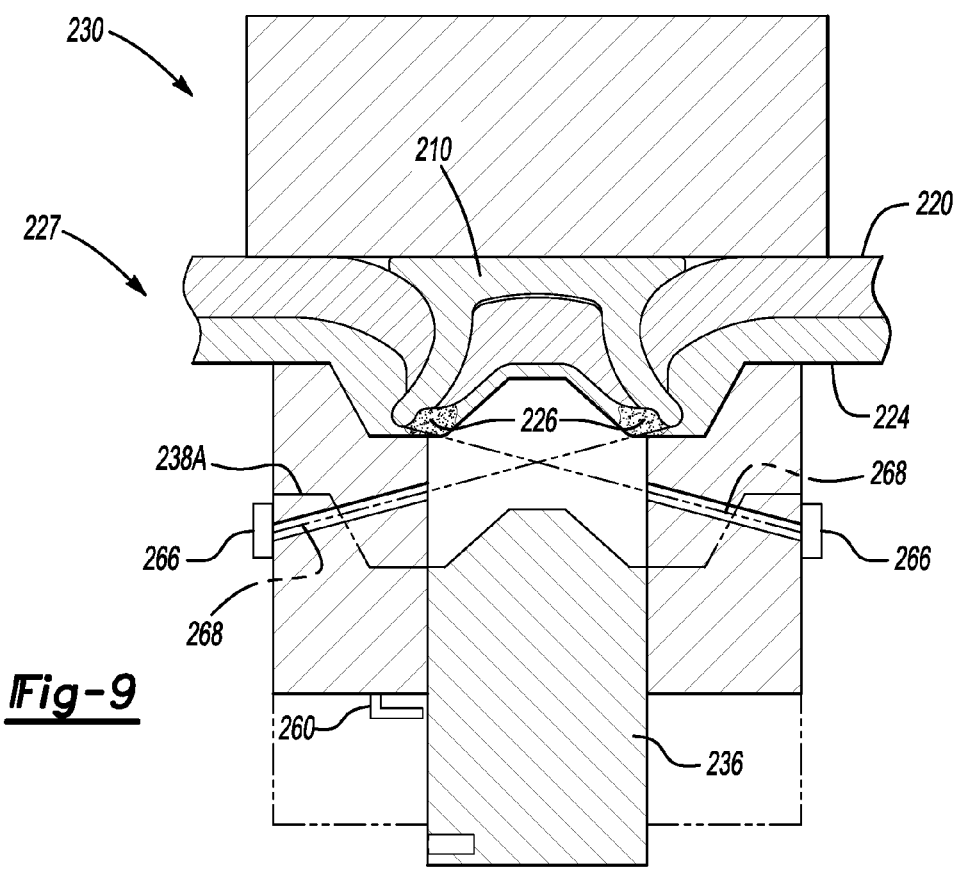
FIG. 9 is a schematic cross-sectional illustration of the die set of FIG. 8 with the first portion unlocked from the second portion and retracted to permit laser welding to create the fused region.

An alternative method 300 of joining a multiple member work-piece is illustrated in FIG. 10 and is described with respect to a die set 230 and assembly 227 of FIGS. 8 and 9. Referring to FIGS. 8 and 9, the assembly 227 is shown supported in die set 230. The die set 230 includes a lower die 232 and a punch 234. The lower die 232 is a split die that includes a generally cylindrical first portion 236, also referred to as an inner die portion, and an annular second portion 238, also referred to as an outer die portion. The first portion 236 and second portion 238 are axisymmetric about an axis 240. The first portion 236 and second portion 238 are selectively lockable to one another through a locking mechanism, here shown as a movable latch 260 and a recess 262 in the first portion 236. Any suitable locking mechanism may be used. The latch 260 may be moved out of the recess 262 to allow independent movement of the first and second portions 236, 238. When not locked to one another, as shown in FIG. 9, the first portion 236 and the second portion 238 are movable relative to one another along the axis 240.

The lower die 232 supports assembly 227. The assembly 227 is alike in all aspects to assembly 27, and includes a self-piercing rivet 210 joining a first member, lower sheet 224, with a second member, upper sheet 220. Prior to assembly, the sheets 220, 224 were originally a work-piece of relatively flat stacked sheets, similar to sheets 20 and 24 of FIG. 3. In FIG. 8, the rivet 210 has penetrated the sheets 220, 224, extending entirely through the top sheet 220 and only penetrating, but not extending through bottom sheet 224, and has deformed to form a mechanical joint or interface 225. As discussed below, under the method 300, a fused region 226 is established in the vicinity of the previous mechanical joint 225 (see FIG. 9), strengthening the integrity of the joined assembly 227.

The lower die 232 has channels or passages 264 machined or formed therein. At one end of each passage 264 is a respective laser mechanism 266. Each laser mechanism 266 is controllable to send a laser beam 268 through the adjacent passage 264, as shown in FIG. 9. As shown in FIG. 9, when the latch 260 is unlocked and the die portion 236 is lowered, the laser beams 268 are directed at the area of the interface 225 of FIG. 8. The laser beams 268 are of sufficient intensity to cause localized melting (i.e., welding) of the rivet 210 and bottom sheet 224, thereby augmenting the mechanical interface 225 with the fused region 226 of FIG. 9. Welding via the laser beams 268 causes heat to originate at the lower surface of the bottom sheet 224 and propagate upward to the joint 225 (see FIG. 8) creating the fused regions 226 (note that this is different than the fused region 26 of FIG. 6 established by resistance heating which causes heat to originate at the interface 25 of FIG. 5).

Referring to FIG. 10, the method 300 begins with step 302, locking the first portion 236 and the second portion 238 of the bottom die 232 together. As described above, the locking is accomplished with latch 260 and recess 262, or any other suitable latching mechanism, and is shown in FIG. 8. In step 304, the sheets 220 and 224 are then stacked on the bottom die 232, with the bottom sheet 224 resting on the bottom die 232. Next, under step 306, the rivet 210 is driven into the sheets 224, and specifically through sheet 220 and penetrating, but not completely passing through sheet 224. Sub step 306, deforming the rivet 210, is included in step 304, and is accomplished in part due to the shape 250 of the die portion 236, which creates a complementary shape 252 of the bottom sheet 224 when pressed against the die portion 236, causing the shank 214 of the rivet 210 to spread and deform as shown in FIG. 8.

After steps 302-306, a mechanical joint 225 is formed between the rivet 210 and the sheets 220, 224. In order to further strengthen the connection of the sheets 220, 224, the method 300 continues with step 310, unlocking the first die portion 236 from the second die portion 238, and step 312, retracting the first portion 236 from the stacked sheets 220, 224. Next, under step 314, the rivet 210 is welded to the bottom sheet 224. The welding is by sub step 316, directing a laser beam 268 through the passage 264 so that it establishes the fused region 226. Preferably, there are multiple passages 264 arranged around the annular die portion 238 to create multiple weld points and resulting fused regions 226 about the lower periphery of the deformed rivet 210. After an appropriate period of time to allow for cooling of the fused regions 226, under step 318, the second die portion 238 is retracted from the welded assembly 227 (i.e., it is moved downward as shown by the phantom as second die portion 238A in FIG. 9). The assembly 227 is now ready for removal from the die set 230.

While the best modes for carrying out the invention have been described in detail, those familiar with the art to which this invention relates will recognize various alternative designs and embodiments for practicing the invention within the scope of the appended claims.

The invention claimed is:

1. A method of joining a multiple member work-piece, comprising:
   stacking members of the work-piece on a die with a first of the members resting on the die;
   driving a rivet into the stacked members until the rivet penetrates all of the members and extends only partially through said first of the members and deforms to establish a riveted joint;
   welding the driven rivet to said first of the members to strengthen the riveted joint; wherein the welding includes passing an electrical current through the driven rivet and said first of the members;
   wherein the die includes a first portion axisymmetric with an annular second portion; and wherein the first portion and second portion are electrically isolated from one another so that the electrical current is passed from the second portion to the first portion through the stacked members and the rivet.

2. The method of claim 1, wherein the stacked members comprise only two members, including said first of the members.

3. The method of claim 1, wherein the rivet and said first of the members are different materials.

4. The method of claim 1 wherein the rivet and said first of the members are substantially identical materials.

5. The method of claim 1, wherein the rivet and the first die have shapes such that the driving includes deforming the rivet to mechanically interlock the stacked members.

6. A method of joining a multiple member work-piece, comprising:
   locking a first portion of a first die with an annular second portion of the first die; wherein the first and second portions are axisymmetric;
   stacking first and second members of the work-piece on the first die such that the first member rests on the first die;
   driving a rivet into the second member via a second die opposing the first die until the rivet penetrates both the first and second members and deforms to establish a riveted joint;
   unlocking the first and second portions of the first die;
   retracting the first portion from the stacked members; and
   welding the driven rivet to the first member to strengthen the riveted joint;
   wherein said welding is by directing a laser beam through a passage in the second portion.

7. The method of claim 6, further comprising:
   retracting the second portion from the stacked members after a predetermined time period.

8. A method of joining a multiple member work-piece, comprising:
   stacking members of the work-piece on a die with a first of the members resting on the die;
   driving a rivet into the stacked members until the rivet penetrates all of the members and deforms to establish a riveted joint;
   passing an electrical current through the driven rivet and said first of the members to thereby weld the driven rivet to said first of the members to strengthen the riveted joint;
   wherein the die includes a first portion axisymmetric with an annular second portion; and wherein the first portion and second portion are electrically isolated from one another so that the electrical current is passed from the second portion to the first portion through the stacked members and the rivet.

* * * * *